United States Patent Office 3,677,699
Patented July 18, 1972

3,677,699
METHOD OF STABILIZING ANHYDROUS SODIUM DITHIONITE
Ryozo Fujiwara, Eiji Ohara, and Kazuo Maeda, Ohmuta, Japan, assignors to Mitsui Toatsu Chemicals, Inc., Tokyo, Japan
No Drawing. Filed June 22, 1970, Ser. No. 48,447
Claims priority, application Japan, June 26, 1969, 44/50,033
Int. Cl. C01b 17/66
U.S. Cl. 23—116          10 Claims

ABSTRACT OF THE DISCLOSURE

A method of stabilizing anhydrous sodium dithionite which comprises coating particles of anhydrous sodium dithionite with a thin film of oxypropylated cellulose or oxypropylated starch.

---

This invention relates to a method of stabilizing anhydrous sodium dithionite. More specifically, it relates to a method of stabilizing anhydrous sodium dithionite which comprises coating particles of anhydrous sodium dithionite with a thin film of oxypropylated cellulose or oxypropylated starch.

When anhydrous sodium dithionite is stored in a dry sealed vessel, it is considerably stable. However, it is promptly decomposed upon contact with air and moisture, sometimes emitting an offensive odor or causing spontaneous combustion. With a view to avoiding this disadvantage, an alkaline agent such as sodium carbonate and sodium sulfite is usually added to anhydrous sodium dithionite as a stabilizer. Since the effect attained by addition of such stabilizer is not sufficient, use of various compounds as stabilizers has been proposed in the art.

For instance, the specification of French Pat. No. 1,381,648 proposes addition of 5–15% of urea and the specification of U.S. Pat. No. 2,516,321 teaches a stabilizing method comprising adding 3–10% of borax and 3–10% of paraformaldehyde in the form of an admixture. These methods, however, are defective in that stabilization cannot be effected unless the additive is incorporated in a relatively great amount.

Japanese patent application publication No. 24,651/67 discloses a method comprising adding 0.08–0.5% of an aldehyde such as propionaldehyde, butyl aldehyde, valeraldehyde and benzaldehyde and the specification of German Pat. No. 1,245,924 teaches a method comprising adding about 0.1% of suberic acid, sebacic acid, azelaic acid or a salt thereof. Further, the specification of U.S. Pat. No. 3,054,658 proposes a method comprising adding about 1% of a mixture of sodium benzoate and sodium acetate, and Japanese patent application publication No. 24,774/68 teaches a method comprising incorporating crystals of sodium dithionite into a solution prepared by throwing coincidentally an alkaline agent and an anionic surfactant such as sodium dodecylbenzene sulfonate into aqueous methanol, filtering the mixture and drying the residue. However, sufficient results cannot be obtained by any of the above-mentioned methods.

The specification of U.S. Pat. No. 2,121,397 discloses a method of stabilizing anhydrous sodium dithionite which comprises forming a water-repellent protective coating of rosin or the like on the surface of particles of anhydrous sodium dithionite. However, since substances to be used for formation of coatings in this method are water-insoluble, when anhydrous sodium dithionite stabilized by this method is dissolved in water, a non-transparent, cloudy solution is formed.

The primary object of this invention is to provide an improved method of stabilizing anhydrous sodium dithionite which overcomes the above-mentioned defects of the conventional methods.

Other objects and advantages of this invention will be apparent from the description given hereinbelow.

It is construed that the decomposition of anhydrous sodium dithionite may be caused to occur by the following mechanism; (1) an anhydrous salt is converted by the presence of a small amount of water to a very instable dihydrous salt, (2) the dihydrous salt forms sulfur dioxide and sodium bisulfite upon contact with oxygen contained in air, and (3) sulfur dioxide or sodium bisulfite reacts with anhydrous sodium dithionite to decompose the same. Thus, based on the viewpoint that in order to prevent decomposition of anhydrous sodium dithionite it is essential to prevent it from having contact with either air or moisture, research has been conducted and as a result we have now found that the above-mentioned object of this invention can be attained by coating particles of anhydrous sodium dithionite with oxypropylated cellulose or oxypropylated starch, thereby preventing the particles from having contact with either air or moisture and prohibiting the decomposition of anhydrous sodium dithionite.

Oxypropylated cellulose to be used in the method of this invention can be synthesized by addition polymerizing propylene oxide to alkali cellulose. This substance is commercially available and is sold, for instance, under the trade name "Klucel" by Hercules Incorporated, U.S.A. This substance is soluble in either water or organic solvents, and when it is precipitated from a solution of such solvent, a transparent, tough film rich in flexibility is obtained. This film is characterized in that it does not allow oxygen or moisture to permeate therethrough.

Oxypropylated starch is synthesized by addition polymerizing propylene oxide to starch, and its solubility in water and organic solvents and viscosity of its solutions in such solvents vary depending on the number of moles of propylene oxide added to starch. In this invention it is desired to use an oxypropylate starch soluble in an organic solvent such as methanol. When oxypropylate starch is dissolved in such solvent and then the solvent is evaporated, a tough film which does not appreciably permit permeation of air and moisture is formed.

Any of the known methods for coating the surfaces of solid substances may be adopted in this invention, in so far as they are able to form a coating on the surfaces of particles of anhydrous sodium dithionite substantially free of water. For instance, stabilized anhydrous sodium dithionite coated with a thin film of oxypropylated cellulose or oxypropylated starch can be obtained by a method comprising dipping dry anhydrous sodium dithionite substantially free of water in a solution of an organic solvent, for instance, methanol, containing 0.05–3% by weight of oxypropylated cellulose or oxypropylated starch, and then drying the same under reduced pressure in a nitrogen current at a temperature of 70–80° C. Alternatively, stabilized anhydrous sodium dithionite may be similarly obtained by removing from an anhydrous salt just prepared by the reaction forming sodium dithionite, moisture adhering to the anhydrous salt by washing with a hydrophilic solvent such as methanol, drying the washed salt and subjecting it to a similar coating treatment as described above.

The amount of oxypropylated cellulose or oxypropylated starch present in the form of a thin film on the surfaces of particles of anhydrous sodium dithionite may be suitably chosen depending on conditions for storing the product, but in many cases it is preferable that the amount is in tthe range of from 0.005 to 2.5% by weight based on the weight of the anhydrous salt to be coated.

Any organic solvent that is inert to anhydrous sodium dithionite and is easily evaporizable may be used in the above-mentioned coating treatment, and this invention is not limited to use of above-mentioned methanol alone.

When sodium carbonate that has been known as a stabilizer is added to anhydrous sodium dithionite stabilized according to this invention, the stabilizing effect can be further improved.

Anhydrous sodium dithionite stabilized according to this invention, namely anhydrous sodium dithionite coated with oxypropylated cellulose or oxypropylated starch, is not at all different from untreated (uncoated) anhydrous sodium dithionite with respect to solubility in water and maintenance of reductive ability, and it may be applied without any disadvantage to uses to which ordinary anhydrous sodium dithionite are applied.

This invention will now be more detailed by referring to non-limitative examples.

EXAMPLE 1

550 g. of methanol were added to 400 g. of an aqueous solution of sodium dithionite ($Na_2S_2O_4$ content=16.0%) and the mixture was heated above 55° C. The resulting suspension of anhydrous sodium dithionite was immediately filtered at elevated temperatures. Then the residue was washed with 50 g. of methanol, and the washed residue was admixed with 100 g. of a 0.1 weight percent solution of oxypropylated starch in methanol, followed by agitation and filtration. The residue was dried under a reduced pressure of 5-10 mm. Hg abs. in a nitrogen current at 70-80° C. for 2 hours. As a result 53.2 g. of a stabilized product of anhydrous sodium dithionite were obtained. The purity of the product was 94.6%. Separately, uncoated anhydrous sodium dithionite was prepared without conducting the coating treatment with oxypropylated starch. The purity of the product was 94.8%.

Each product was divided into two portions and sodium carbonate was added as an additional stabilizer to one portion in an amount of 1.5% by weight based on anhydrous sodium dithionite. With a view to comparing stability of the four samples, they were stored for 25 hours in air maintained at a temperature of 30° C. and a relative humidity of 75%, and changes in purity were measured with respect to each sample. Results are shown in Table 1.

TABLE 1.—PURITY CHANGES IN PRODUCTS

| Product sample | Purity just after preparation (percent) (A) | Purity after 25 hours[1] (percent) (B) | B/A ×100% |
|---|---|---|---|
| Products stabilized with oxypropylated starch: | | | |
| Sodium carbonate added | 93.2 | 87.9 | 94.3 |
| Sodium carbonate not added | 94.6 | 85.6 | 90.5 |
| Untreated products: | | | |
| Sodium carbonate added | 93.5 | 58.0 | 62.0 |
| Sodium carbonate not added | 94.8 | 52.2 | 55.1 |

[1] Storage at 30° C. and R.H. of 75%.

EXAMPLE 2

A solution of 0.1 g. of oxypropylated starch dissolved in 130 g. of methanol was added to 100 g. of crystals of anhydrous sodium dithionite, and the mixture was agitated for 2 minutes, followed by filtration. The residue was dried at 70-80° C. under a reduced pressure of 5-10 mm. Hg abs. in a nitrogen current for 2 hours. The purity of the resulting coated product was 91.2% (I). The product was charged in a closed vessel and stored for 2 months. Every fourth day during the above storage, the vessel was opened for 10 minutes so as to allow the product to have contact with air, and then the vessel was closed again. After the lapse of 2 months, the purity of the product was found to have been reduced to 87.0% (II). (II/I×100=95.4%).

Uncoated anhydrous sodium dithionite prepared in the same manner as above except that oxypropylated starch was not used was subjected under the same storing conditions as above. The purity of the untreated product was reduced from 91.0% (III) to 78.6% (IV). (IV/III ×100=86.4%).

EXAMPLE 3

550 g. of methanol were added to 400 g. of an aqueous solution of sodium dithionite ($Na_2S_2O_4$ content=15.3%) and the mixture was heated above 55° C. The resulting suspension of anhydrous sodium dithionite was immediately filtered at elevated temperatures. The residue was washed with 50 g. of methanol and mixed with 100 g. of a 0.5 weight percent methanol solution of "Klucel J" (tradename for oxypropylated cellulose produced by Hercules Incorporated, U.S.A.) and the mixture was agitated for 2 minutes, followed by filtration. The residue was dried at 70-80° C. under a reduced pressure of 5-10 mm. Hg abs. in a nitrogen current for 2 hours. As a result 51.5 g. of a stabilized product of anhydrous sodium dithionite, whose purity was 95.8% were obtained.

Separately, uncoated anhydrous sodium dithionate (purity=96.1%) was prepared in the same manner except that the coating treatment with "Klucel J" was not conducted.

Each sample product was divided into two portions, and to one portion sodium carbonate was added as an additional stabilizer in an amount of 1.5% by weight based on the anhydrous sodium dithionite. With a view to comparing stability of the four samples, so prepared they were stored for 25 hours in air maintained at a temperature of 30° C. and a relative humidity of 75%, and changes in purity were measured with respect to each sample. Results are shown in Table 2.

TABLE 2.—PURITY CHANGES IN PRODUCTS

| Product sample | Purity just after preparation (percent) (A) | Purity after 25 hours[1] (percent) (B) | B/A ×100% |
|---|---|---|---|
| Products stabilized with oxypropylated cellulose: | | | |
| Sodium carbonate added | 94.5 | 88.0 | 93.1 |
| Sodium carbonate not added | 95.8 | 85.4 | 89.1 |
| Untreated products: | | | |
| Sodium carbonate added | 94.7 | 57.5 | 60.7 |
| Sodium carbonate not added | 96.1 | 53.8 | 56.0 |

[1] Storage at 30° C. and R.H. of 75%.

EXAMPLE 4

A solution of 0.5 g. of "Klucel J" dissolved in 130 g. of methanol was added to 100 g. of crystals of anhydrous sodium dithionate (fine granular product of a specific surface area of 0.5-0.8 m.$^2$/g. prepared by a sodium formate method) and the mixture was stirred for 2 minutes, followed by filtration. The residue was dried at 70-80° C. in a nitrogen current under a reduced pressure of 5-10 mm. Hg abs. for 2 hours. The purity of the resulting coated product was 90.6% (I). The product was charged in a closed vessel and stored for 2 months. Every fourth day, the vessel was opened for 10 minutes so as to allow the product to have contact with air, and then the vessel was closed again. After the lapse of 2 months, the purity of the product was found to have been reduced to 87.4% (II). (II/I×100=96.4%).

Uncoated anhydrous sodium dithionite prepared in the same manner as above except that "Klucel J" was not used was subjected under the same storing conditions as above. The purity of the uncoated product was reduced from 90.7% (III) to 77.2% (IV). (IV/III×100=85.1%).

What we claim is:

1. A method of stabilizing anhydrous sodium dithionite particles which comprises coating particles of anhydrous sodium dithionite with a thin film of oxypropylated cellulose or oxypropylated starch.

2. A method of forming stabilized anhydrous sodium dithionite particles which comprises coating particles of anhydrous sodium dithionite with a thin film of oxypropylated cellulose or oxypropylated starch, the amount of said thin film being 0.005–2.5% by weight based on the weight of the particles of anhydrous sodium dithionite.

3. A method of forming stabilized anhydrous sodium dithionite particles which comprises treating particles of anhydrous sodium dithionite substantially free of water with an organic solvent containing 0.05–3% by weight of oxypropylated cellulose or oxypropylated starch, and drying the coated particles in a nitrogen current under a reduced pressure to thereby form a thin film of oxypropylated cellulose or oxypropylated starch on the surfaces of the particles of anhydrous sodium dithionite, the amount of said thin film being 0.005–2.5% by weight based on the weight of the particles of anhydrous sodium dithionite.

4. The method of claim 1 wherein said thin film of oxypropylated cellulose or oxypropylated starch additionally contains sodium carbonate.

5. The method of claim 2 wherein said thin film of oxypropylated cellulose or oxypropylated starch additionally contains sodium carbonate.

6. The method of claim 3 wherein said thin film of oxypropylated cellulose or oxypropylated starch additionally contains sodium carbonate.

7. Stabilizer anhydrous sodium dithionite consisting essentially of discrete particles of anhydrous dithionite coated with a thin film of oxypropylated cellulose or oxypropylated starch.

8. The stabilized anhydrous sodium dithionite of claim 7 wherein said thin film comprises 0.005–2.5% by weight based on the weight of the anhydrous sodium dithionite.

9. The stabilized anhydrous sodium dithionite of claim 7 wherein said thin film of oxypropylated cellulose or oxypropylated starch additionally contains sodium carbonate.

10. The stabilized anhydrous sodium dithionite of claim 8 wherein said thin film of oxypropylated cellulose or oxypropylated starch additionally contains sodium carbonate.

References Cited
UNITED STATES PATENTS

| | | | |
|---|---|---|---|
| 871,629 | 11/1907 | Reinking | 23—116 X |
| 2,109,708 | 3/1938 | Pfister | 23—116 X |
| 2,121,397 | 6/1938 | Downing et al. | 23—116 |

EARL C. THOMAS, Primary Examiner

U.S. Cl. X.R.

252—188

UNITED STATES PATENT OFFICE
CERTIFICATE OF CORRECTION

Patent No. 3,677,699          Dated July 18, 1972

Inventor(s) RYOZO FUJIWARA ET AL

It is certified that error appears in the above-identified patent and that said Letters Patent are hereby corrected as shown below:

Claim 1, Column 4, line 69, delete "stabilizing" and insert --forming stabilized--

Claim 7, Column 5, line 25, change "Stabilizer" to

--Stabilized--

Signed and sealed this 30th day of January 1973.

(SEAL)
Attest:

EDWARD M. FLETCHER, JR.
Attesting Officer

ROBERT GOTTSCHALK
Commissioner of Patents